United States Patent [19]

Ishiwari et al.

[11] Patent Number: 5,470,901
[45] Date of Patent: Nov. 28, 1995

[54] POLYPHENYLENE SULFIDE RESIN COMPOSITION AND PROCESS FOR PREPARING THE SAME

[75] Inventors: Kazuo Ishiwari; Yoshihisa Yamamoto; Tetsuo Shimizu, all of Osaka, Japan

[73] Assignee: Daikin Industries, Ltd., Osaka, Japan

[21] Appl. No.: 376,437

[22] Filed: Jan. 23, 1995

Related U.S. Application Data

[63] Continuation of Ser. No. 134,369, Oct. 12, 1993, abandoned, which is a continuation of Ser. No. 619,420, Nov. 29, 1990, abandoned.

[30] Foreign Application Priority Data

Nov. 30, 1989 [JP] Japan ................... 1-311507

[51] Int. Cl.$^6$ .................... C08L 83/00; C08L 81/02
[52] U.S. Cl. .................. 524/345; 525/189; 524/413; 524/423; 524/425; 524/428; 524/431; 524/442; 524/444; 524/445; 524/449; 524/451; 524/452; 524/455; 524/492; 524/493; 524/494; 524/514; 524/609
[58] Field of Search ............... 525/189; 524/345, 524/413, 423, 425, 428, 431, 442, 444, 445, 449, 451, 452, 455, 492, 493, 494, 514, 609

[56] References Cited

U.S. PATENT DOCUMENTS

| | | | |
|---|---|---|---|
| 4,395,512 | 7/1983 | Kubota et al. | 524/413 |
| 4,703,076 | 10/1987 | Mori | 525/189 |
| 4,847,135 | 7/1989 | Braus et al. | 428/138 |
| 5,006,594 | 4/1991 | Rees | 525/189 |
| 5,091,463 | 2/1992 | Onishi et al. | 525/189 |
| 5,093,403 | 3/1992 | Rau et al. | 525/189 |
| 5,159,019 | 10/1992 | Yamamoto et al. | 525/189 |
| 5,244,975 | 9/1993 | Asai et al. | 525/189 |
| 5,371,143 | 12/1994 | Novak et al. | 525/88 |
| 5,397,831 | 3/1995 | Saito et al. | 525/189 |

OTHER PUBLICATIONS

WPI, File Supplier, AN=87–282027, Derwent Publications Ltd., London, GB & JP–A–62 197 452 (Asahi Glass) 01–09–1987.

WPIL, File Supplier, AN=83–08517k, Derwent Publications, Ltd., London, GB; & JP–A–57 202 344 (Shinetsu Chem) 11–12–1982.

*Primary Examiner*—George F. Lesmes
*Assistant Examiner*—Helen F. Lee
*Attorney, Agent, or Firm*—Birch, Stewart, Kolasch & Birch

[57] ABSTRACT

A polyphenylene sulfide resin composition comprising 100 parts by weight of a polyphenylene sulfide resin and 0.5 to 50 parts by weight of a crosslinked fluorine-containing elastomer, which has improved impact resistance while keeping excellent properties of the polyphenylene sulfide resin.

8 Claims, No Drawings

POLYPHENYLENE SULFIDE RESIN COMPOSITION AND PROCESS FOR PREPARING THE SAME

This application is a continuation of application Ser. No. 08/134,369 filed on Oct. 12, 1993, now abandoned, which is a continuation of application Ser. No. 07/619,420 filed on Nov. 29, 1990, now abandoned.

BACKGROUND OF THE INVENTION

1. Field of the Invention

The present invention relates to a polyphenylene sulfide resin composition with improved impact resistance and a process for preparing the same.

The polyphenylene sulfide resin composition can be used as a sealing material for electronic parts, a material for producing electric and electronic parts, a material for automobile parts, a heat resistant coating or connector parts.

2. Description of the Related Art

A polyphenylene sulfide resin is one of engineering plastics having excellent heat resistance, chemical resistance and electric properties and is used in various fields. However, the polyphenylene sulfide resin has poor toughness and insufficient mechanical properties, in particular, impact resistance. Therefore, its application for a structural part which requires good mechanical properties or a sealing material in which generation of stress-strain is prevented during sealing, or in the fields where flexibility is required is largely limited.

In general, to reduce stress of a resin, a flexible polymer is blended with the resin. It is proposed to blend the polyphenylene sulfide resin with a fluorine-containing elastomer as a flexible polymer which has heat resistance and chemical resistance and does not deteriorate good heat resistance and chemical resistance of the polyphenylene sulfide so as to improve impact resistance (see Japanese Patent Publication No. 202344/1982). In this blend, dispersibility of the fluorine-containing elastomer in the polyphenylene sulfide is insufficient, and improvement of the impact resistance is unsatisfactory. In addition, the mechanical properties of the polyphenylene sulfide resin are deteriorated.

It is proposed to blend the polyphenylene sulfide resin with a fluorine-containing thermoplastic elastomer to improve the impact resistance (see Japanese Patent Kokai Publication No. 218446/1987). In this blend, the dispersibility is insufficient and improvement of the impact resistance is unsatisfactory. In addition, the fluorine-containing thermoplastic elastomer is expensive.

In the blend of the polyphenylene sulfide resin with the flexible polymer, the latter is preferably finely dispersed in the former. In this respect, the fluorine-containing polymer is not sufficiently dispersed in the polyphenylene sulfide resin.

To improve the dispersibility of the blend, a compatibilizer can be added to the blend. In case of the mixture of the polyphenylene sulfide resin and the fluorine-containing elastomer, there is no compatibilizer having heat resistance and chemical resistance.

SUMMARY OF THE INVENTION

One object of the present invention is to provide a polyphenylene sulfide resin composition with improved impact resistance.

Another object of the present invention is to provide a process for preparing a polyphenylene sulfide resin composition with improved impact resistance.

According to a first aspect of the present invention, there is provided a polyphenylene sulfide resin composition which comprises 100 parts by weight of a polyphenylene sulfide resin and 0.5 to 50 parts by weight of a crosslinked fluorine-containing elastomer.

According to a second aspect of the present invention, there is provided a process for preparing a polyphenylene sulfide resin composition which comprises melt mixing 100 parts by weight of a polyphenylene sulfide resin and 0.5 to 50 parts by weight of a fluorine-containing elastomer and crosslinking the fluorine-containing elastomer during melt mixing.

DETAILED DESCRIPTION OF THE INVENTION

The polyphenylene sulfide resin to be used in the present invention may be one which is uncrosslinked, partly crosslinked or a mixture thereof. Further, the polyphenylene sulfide resin may be modified. The polyphenylene sulfide resin is commercially available. Examples are polyphenylene sulfide resins sold by Polyplastics under a trade mark "Fortron" and polyphenylene sulfide resins sold by Phillips Petroleum under a trade mark "Ryton".

The fluorine-containing elastomer is a highly fluorinated elastomeric copolymer. A preferred example of the fluorine-containing elastomer is an elastomeric copolymer comprising 40 to 85% by mole of vinylidene fluoride and at least one other fluorine-containing ethylenically unsaturated monomer which is copolymerizable with vinylidene fluoride. As the fluorine-containing elastomer, one containing at least one iodine atom in a molecular chain can be used. Such fluorine-containing elastomer comprises 40 to 85% by weight of vinylidene fluoride and at least one fluorine-containing ethylenically unsaturated monomer which is copolymerizable with vinylidene fluoride and contains 0.001 to 10% by weight, preferably 0.01 to 5% by weight of the iodine atoms bonded to the polymer chain ends (see Japanese Patent Kokai Publication No. 40543/1977).

Examples of the fluorine-containing ethylenically unsaturated monomer which is copolymerizable with vinylidene fluoride are hexafluoropropylene, pentafluoropropylene, trifluoroethylene, chlorotrifluoroethylene, tetrafluoroethylene, vinyl fluoride, perfluoro(methyl vinyl ether), perfluoro(ethyl vinyl ether), perfluoro(propyl vinyl ether) and the like.

Preferred examples of the fluorine-containing elastomer are vinylidene fluoride/hexafluoropropylene copolymers and vinylidene fluoride/tetrafluoroethylene/hexafluoropropylene terpolymers.

Most of the fluorine-containing elastomer are commercially available. For example, the vinylidene fluoride/hexafluoropropylene copolymers are available from Daikin Industries, Ltd. under a trade mark "Dai-el" G-701, etc., the vinylidene fluoride/hexafluoropropylene/tetrafluoroethylene terpolymers are available from Daikin Industries, Ltd. under a trade mark "Dai-el" G-602, etc., tetrafluoroethylene/propylene copolymers are available from Asahi Glass Company Limited under a trade mark "Afras 100", etc., vinylidene fluoride/chlorotrifluoroethylene copolymers are available from 3M under a trade mark "Kel-F" elastomer, tetrafluoroethylene/perfluoro(alkyl vinyl ether) copolymers are available from Daikin Industries, Ltd. under a trade mark "Dai-el" Perflo, and fluorine-containing thermoplastic elastomers are available from Daikin Industries, Ltd. under a trade mark "Dai-el" Thermo T-530 and T-630.

The fluorine-containing elastomers may be used independently or as a mixture of two or more.

The fluorine-containing thermoplastic elastomer to be used in the present invention is a straight, branched or radially grown block copolymer comprising at least one fluororesin block (A) having a molecular weight of 2000 to 500,000 as a hard segment and at least one fluorine-containing elastomer block (B) having a molecular weight of 20,000 to 1,500,000 as a soft segment wherein a weight ratio of the fluororesin block (A) to the fluorine-containing elastomer block (B) is from 5:95 to 60:40.

Examples of the fluororesin block (A) are polytetrafluoroethylene resins, tetrafluoroethylene/hexafluoropropylene copolymer resins tetrafluoroethylene/perfluoro(alkyl vinyl ether) copolymer resins, tetrafluoroethylene/ethylene copolymer resins, polychlorotrifluoroethylene resins, polyvinylidene fluoride resins, vinylidene fluoride/tetrafluoroethylene copolymer resins, and ethylene/tetrafluoroethylene/hexafluoropropylene copolymer resins.

Examples of the fluorine-containing elastomer block (B) are vinylidene fluoride/chlorotrifluoroethylene copolymers, vinylidene fluoride/hexafluoropropylene copolymers, vinylidene fluoride/pentafluoropropylene copolymers, a terpolymer comprising one of these copolymer and tetrafluoroethylene, fluorinated silicones, phosphazene, tetrafluoroethylene/perfluoro(methyl vinyl ether) copolymers, and tetrafluroethylene/propylene copolymers.

Usually, 0.1 to 50 parts by weight of the fluorine-containing elastomer is blended with 100 parts of the polyphenylene sulfide resin. When the amount of the fluorine-containing elastomer is less than 0.1 parts by weight, the properties of the blend are not improved. When the amount of the fluorine-containing elastomer exceeds 50 parts by weight, strength and heat resistance (e.g. heat deformation temperature) are severely deteriorated, and moldability of the blend is deteriorated due to the increase of melt viscosity. When the blend is used as a sealing material for the electronic parts, the amount of the fluorine-containing elastomer is preferably from 5 to 30 parts by weight per 100 parts by weight of the polyphenylene sulfide resin.

To improve the mechanical properties, various fillers may be added to the composition of the present invention. Examples of the fillers are glass fibers, asbestos fibers, silica fibers, silica-alumina fibers, alumina fibers, zirconia fibers, potassium titanate whiskers, polyamide fibers, polyphenol fibers, silica, talc, clay, mica, calcium carbonate, barium sulfate, titanium oxide, silicon nitride and the like.

To crosslink the fluorine-containing elastomer in the composition of the present invention, any of the conventional crosslinking systems, namely a combination of a crosslinking agent and a crosslinking aid may be used.

Examples of the crosslinking agent are organic peroxide compounds, polyamine compound, polyhydroxy compounds and polythiol compounds.

An amount of the crosslinking agent is usually from 0.05 to 10 parts by weight, preferably from 0.1 to 5 parts by weight per 100 parts of the fluorine-containing elastomer.

As the organic peroxide compound, a compound which easily generates a peroxy radical by heating or in the presence of a redox system. Preferred examples of the organic peroxide compound are 1,1-bis(tert.-butylperoxy)-3,5,5-trimethylcyclohexane, 2,5-dimethylhexane-2,5-dihydrdoxy peroxide, di-tert.-butyl peroxide, tert.-butyl-cumyl peroxide, dicumyl peroxide, α,α'-bis(tert.-butylperoxy)-p-diisopropylbenzene, 2,5-dimethyl-2,5-di(tert.-butylperoxy)hexane, 2,5-dimethyl-2,5-di(tert.-butylperoxy)-hexine- 3, benzoyl peroxide, tert.-butyl peroxybenzene, 2,5-dimethyl-2,5-di(benzoylperoxy)hexane, tert.-butyl peroxymaleate, tert.-butyl peroxyisopropylcarbonate and the like. Among them, dialkyl type compounds are preferred. The type and amount of the organic peroxide compound are selected according to an amount of active —O—O, a decomposition temperature, etc.

When the organic peroxide compound is used for crosslinking, the further use of a crosslinking aid or co-crosslinking agent improves a crosslinking efficiency significantly. Any of the crosslinking aid or co-crosslinking agent may be used insofar as it has a reaction activity with both the peroxy radical and a polymer radical. Preferred examples of the crosslinking aid or co-crosslinking agent are triallyl cyanurate, trially isocyanurate, triacryl formal, triallyl trimellitate, N,N'-m-phenylenebismaleimide, dipropargyl terephthalate, diallyl phthalate, tetraallyl terephthalamide and the like.

The polyamine compound may be a primary or secondary amine having at least two basic nitrogen atoms in a molecule. In many cases, the polyamine compound is used in the form of a salt having a milder reactivity. In general, alkylenediamines are used. Among them, ethylenediamine carbamate, hexamethylenediamine carbamate, 4,4'-diaminocyclohexylmethane carbamate, and the like are preferably used. In addition, Schiff bases such as N,N'-dicinnamylidene- 1,6-hexamethylenediamine are preferably used. An aromatic polyamine compound having weak basicity may be used together with other base. Examples of the other base are diphenylguanidine, di-o-triguanidine, diphenylthiourea, 2-mercaptoimidazoline, a compound which has —NH$_2$ and/or —NH— in a molecule and is used as an accelerator for a synthetic elastomer, and hydroxides of divalent metals.

As the polyhydroxy compound, are used a polyhydroxy compound having enol type hydroxy groups

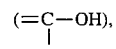

a dihydroxy compound of the formula: R'$_f$(CH$_2$OH)$_2$ wherein R'$_f$ is a C$_1$-C$_{20}$ polyfluoroalkylene or perchlorofluoroalkylene group, their alkaline metal salt, and mixtures thereof. Preferred examples of the polyhydroxy compound are hydroquinone, 2,2-bis(4-hydroxyphenyl)propane, 2,2-bis(4-hydroxyphenyl)perfluoropropane (bisphenol-AF), 2,2-bis(4-hydroxyphenyl)butane, 1,1-bis(4-hydroxyphenyl)methane, 4,4'-dihydroxyphenylether, HOCH$_2$(CF$_2$)$_3$CH$_2$OH, HOCH$_2$CFH(CF$_2$)$_3$CFH—CF$_2$CH$_2$OH, HOCH$_2$CH$_2$CH$_2$(CF$_2$)$_3$CH$_2$CH$_2$CH$_2$OH, HOCH$_2$CF$_2$CH$_2$(CF$_2$)$_3$— CH$_2$CF$_2$CH$_2$OH and their alkali metal salts.

As the thiol compound, aliphatic or aromatic dithiols are usually used. Preferred examples are dimercaptodimethylether, dimercaptomethylsulfide, 1,6-hexanedithiol, ethylenebismercaptoacetate, 1,5-naphthalenedithiol, 4,4'-dimercaptodiphenyl and their alkali metal salts.

The crosslinking of the composition may be carried out in the presence of an oxide or hydroxide of a divalent metal as an acid scavenger in addition to the above crosslinking agent. Examples of the oxide and hydroxide of the divalent metal are oxides and hydroxides of Ca, Mg, Pb and Zn. They may be used in the form of a double salt. They not only act as the acid scavenger but also improve crosslinking reactivity and mechanical properties or heat resistance of the composition.

Further, as a crosslinking accelerator, a tertiary amine, a tri-substitued amidine and a penta-substuted guanidines, their salts with an organic acid or an inorganic acid; a quaternary ammonium salt; or a quaternary phosphonium salt may be used. Such crosslinking accelerators are disclosed in Japanese Patent Kokai Publication Nos. 56854/1976, 1387/1972 and 191/1972.

Preferred crosslinking systems are a system comprising magnesium oxide, calcium hydroxide, bisphenol-AF and 8-benzyl-1,8-diazabicyclo[5.4.0]-7-undecenium chloride (hereinafter referred to as "DBU-B"), a system comprising a magnesium oxide, bisphenol-AF and an organophosphonium salt, a system comprising magnesium oxide, dipotassium salt of bisphenol-AF and dicyclohexyl-18-crown-6, and a system comprising dicumyl peroxide and triallyl isocyanurate. Further, the crosslinking system disclosed in Japanese Patent Kokai Publication No. 90836/1981 may be used.

In view of the melt mixing temperature and the crosslinking rate at the melt mixing temperature, the polyol base crosslinking system comprising bisphenol-AF is preferred.

A dynamic crosslinking method comprises melt mixing the polyphenylene sulfide resin and the fluorine-containing elastomer preferably at a temperature of 280° to 330° C. with a conventional mixing machine such as a Brabender mixer, a Banbury mixer, a kneader and a kneading extruder, adding the crosslinking agent and the crosslinking aid, mixing the polymer composition containing the crosslinking agent and the crosslinking aid to cross link the fluorine-containing elastomer to obtain the polymer composition in which the crosslinked fluorine-containing elastomer particles are dispersed in the polyphenylene sulfide resin.

When the fluorine-containing elastomer is not crosslinked with the crosslinking agent and the crosslinking aid at a room temperature, the latter agent and aid may be added to the fluorine-containing elastomer before it is blended with the polyphenylene sulfide resin. That is, the timing of the addition of the crosslinking agent and the crosslinking aid can be so selected that the fluorine-containing elastomer is crosslinked when the polymer blend is melt mixed.

In the composition of the present invention, the crosslinked fluorine-containing elastomer particles are dispersed in the polyphenylene sulfide resin. Therefore, the composition has improved impact strength.

The polyphenylene sulfide resin composition of the present invention has improved impact strength while maintaining the excellent properties of the polyphenylene sulfide resin. Therefore, the polyphenylene sulfide resin composition of the present invention is suitably used in various fields including the production of electronic parts.

The present invention will be illustrated by the following Examples

EXAMPLES 1 AND 2 COMPARATIVE EXAMPLES 1 AND 2

An amount of polyphenylene sulfide resin (Fortron 1140 A manufacture by Polyplastics, containing 40% by weight of glass fibers) was charged in a Brabender mixer kept at 300° C. and kneaded at 50 rpm for 5 minutes. Then, a fluorine-containing elastomer (Dai-el G-602, a copolymer of vinylidene fluoride, hexafluoropropylene and tetrafluoroethylene manufactured by Dakin Industries, Ltd.), bisphenol-AF and DBU-B were added in amounts shown in Table and kneaded at 100 rpm for 5 minutes. To the polymer mixture, magnesium oxide and calcium hydroxide were added to the polymer mixture, and the mixture was melt kneaded to crosslink the fluorine-containing elastomer.

Just after the addition of magnesium oxide and calcium hydroxide, torque was increased slightly and stabilized after about 5 minutes. After stabilization of the torque, the mixer was stopped and the composition was removed from the mixer.

The composition was injection molded at a resin melt temperature of 310° C. and a mold temperature of 170° C. to produce a sample piece for measurement of the physical properties.

For comparison, the polymer blend without any crosslinking agent or any crosslinking aid was injection molded to produce a comparative sample piece.

The measured properties and methods for measurements are as follows:

IZOD IMPACT STRENGTH

By using the U-F impact tester (manufactured by Ueshima Manufacturing Co., Ltd.), Izod impact strength is measured on the notched side according to ASTM D 256.

STIFFNESS

By using the stiffness tester (manufactured by Ueshima Manufacturing Co., Ltd.), stiffness is measured according to ASTM D 747.

The results are shown in Table.

TABLE

| Component | Example No. | | | |
|---|---|---|---|---|
| (parts by weight) | 1 | 2 | C. 1 | C. 2 |
| Polyphenylene sulfide resin | 90 | 80 | 100 | 80 |
| F-cont. elastomer | 10 | 20 | — | 20 |
| Bisphenol-AF | 0.2 | 0.4 | — | — |
| DBU-B | 0.035 | 0.07 | — | — |
| MgO | 0.3 | 0.6 | — | — |
| Ca(OH)$_2$ | 0.6 | 1.2 | — | — |
| Izod impact strength (kg.cm/cm) | 9.5 | 11.6 | 5.9 | 7.5 |
| Stiffness (kg/cm$^2$ × 10$^4$) | 2.9 | 2.8 | 3.0 | 2.8 |

What is claimed is:

1. A polyphenylene sulfide resin composition which comprises 100 parts by weight of an uncrosslinked polyphenylene sulfide resin and 0.5 to 50 parts by weight of a crosslinked fluorine-containing elastomer which is crosslinked with a crosslinking agent selected from the group consisting of polyamine compounds, polyhydroxy compounds and polythiol compounds.

2. The polyphenylene sulfide resin composition according to claim 1, which comprises 100 parts by weight of the polyphenylene sulfide resin and 5 to 30 parts by weight of the fluorine-containing elastomer.

3. The polyphenylene sulfide resin composition according to claim 1, wherein the fluorine-containing elastomer is a copolymer of 40 to 85% by mole of vinylidene fluoride and at least one other fluorine-containing ethylenically unsaturated monomer which is copolymerizable with vinylidene fluoride.

4. The polyphenylene sulfide resin composition according to claim 3, wherein the other fluorine-containing ethylenically unsaturated monomer is at least one member selected from the group consisting of hexafluoropropylene, pentafluoropropylene, trifluoroethylene, chlorotrifluoroethylene, tetrafluoroethylene, vinyl fluoride, perfluoro (methyl vinyl ether), perfluoro (ethyl vinyl ether) and perfluoro (propyl vinyl ether).

5. The polyphenylene sulfide resin composition according to claim 1, wherein the crosslinked fluorine-containing elastomer is a straight, branched or radically grown block copolymer.

6. The polyphenylene sulfide resin composition according to claim 1, wherein the crosslinked fluorine-containing elastomer is a radically grown block copolymer comprising at least one fluororesin block (A) having a molecular weight of 2000 to 500,000 as a hard segments and at least one fluorine-containing elastomer block (B) having a molecular weight of 20,000 to 1,500,000 as a soft segment wherein a weight ratio of the fluororesin block (A) to the fluorine-containing elastomer block (B) is from 5:95 to 60:40.

7. The polyphenylene sulfide resin composition according to claim 1 which further comprise a filler.

8. The polyphenylene sulfide resin composition according to claim 7, wherein the filler is at least a member selected from the group consisting of glass fiber, asbestos fiber, silica fiber, silica-alumina fiber, alumina fiber, zirconia fiber, potassium titanate whisker, polyamide fiber, polyphenol fiber, silica, talc, clay, mica, calcium carbonate, barium sulfate, titanium oxide and silicon nitride.

* * * * *